(12) United States Patent
Frank et al.

(10) Patent No.: US 10,140,673 B2
(45) Date of Patent: *Nov. 27, 2018

(54) POTENTIAL REALIZATION SYSTEM WITH ELECTRONIC COMMUNICATION PROCESSING FOR CONDITIONAL RESOURCE INCREMENTATION

(71) Applicant: AT&T Intellectual Property I, L.P., Atlanta, GA (US)

(72) Inventors: Scott M. Frank, Dunwoody, GA (US); Robert A. Koch, Norcross, GA (US); Jeffrey R. Kuester, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 464 days.

This patent is subject to a terminal disclaimer.

(21) Appl. No.: 14/845,889

(22) Filed: Sep. 4, 2015

(65) Prior Publication Data

US 2016/0005138 A1  Jan. 7, 2016

Related U.S. Application Data

(63) Continuation of application No. 11/395,088, filed on Mar. 31, 2006, now Pat. No. 9,129,252.

(51) Int. Cl.
*G06Q 30/00* (2012.01)
*G06Q 50/18* (2012.01)
*G06Q 10/10* (2012.01)
*G06Q 40/06* (2012.01)

(52) U.S. Cl.
CPC ........... *G06Q 50/184* (2013.01); *G06Q 10/10* (2013.01); *G06Q 40/06* (2013.01); *G06Q 50/18* (2013.01)

(58) Field of Classification Search
None
See application file for complete search history.

(56) References Cited

U.S. PATENT DOCUMENTS

| 5,208,765 | A | 5/1993 | Turnbull |
| 5,526,257 | A | 6/1996 | Lerner |
| 5,692,206 | A | 11/1997 | Shirley et al. |
| 5,754,840 | A | 5/1998 | Rivette et al. |
| 5,774,833 | A | 6/1998 | Newman |
| 5,917,912 | A | 6/1999 | Ginter et al. |

(Continued)

FOREIGN PATENT DOCUMENTS

| WO | WO 01/08031 A2 | 2/2001 |
| WO | WO 01/024035 | 5/2001 |

OTHER PUBLICATIONS

U.S. Appl. No. 09/750,000, filed Dec. 29, 2000.

(Continued)

*Primary Examiner* — Alvin L Brown
(74) *Attorney, Agent, or Firm* — Hartman & Citrin LLC

(57) ABSTRACT

Selected embodiments of the present disclosure provide methods, systems and media for systematically processing electronic communications for conditionally incrementing resources. In certain embodiments, electronic communications are received and processed in order to evaluate potential realization assistance functions by potential realization assistants according to processes that include resource incrementations that are conditioned on satisfactory potential realization function processing. Other methods, systems and media are also provided.

20 Claims, 7 Drawing Sheets

(56) References Cited

U.S. PATENT DOCUMENTS

| | | | |
|---|---|---|---|
| 5,991,751 | A | 11/1999 | Rivette et al. |
| 6,014,663 | A | 1/2000 | Rivette et al. |
| 6,044,354 | A | 3/2000 | Asplen |
| 6,049,811 | A | 4/2000 | Petruzzi et al. |
| 6,061,660 | A | 5/2000 | Eggleston et al. |
| 6,067,531 | A | 5/2000 | Hoyt et al. |
| 6,236,977 | B1 | 5/2001 | Verba et al. |
| 6,263,314 | B1 | 7/2001 | Donner |
| 6,289,341 | B1 | 9/2001 | Barney |
| 6,298,327 | B1 | 10/2001 | Hunter et al. |
| 6,321,983 | B1 | 11/2001 | Katayanagi et al. |
| 6,339,767 | B1 | 1/2002 | Rivette et al. |
| 6,345,239 | B1 | 2/2002 | Bowman-Amuah |
| 6,389,418 | B1 | 5/2002 | Boyack et al. |
| 6,389,538 | B1 | 5/2002 | Gruse et al. |
| 6,452,613 | B1 | 9/2002 | Lefebvre et al. |
| 6,499,026 | B1 | 12/2002 | Rivette et al. |
| 6,542,871 | B1 | 4/2003 | Harshaw |
| 6,556,992 | B1 | 4/2003 | Barney et al. |
| 6,571,241 | B1 | 5/2003 | Nosohara |
| 6,662,178 | B2 | 12/2003 | Lee |
| 6,665,670 | B2 | 12/2003 | Winer et al. |
| 6,694,331 | B2 | 2/2004 | Lee |
| 6,731,826 | B1 | 5/2004 | Yamamoto et al. |
| 6,850,935 | B1 | 2/2005 | Ponte |
| 7,127,405 | B1 | 10/2006 | Frank |
| 7,346,518 | B1 | 3/2008 | Frank |
| 7,386,460 | B1 | 6/2008 | Frank et al. |
| 7,389,239 | B1 | 6/2008 | Frank |
| 7,406,425 | B1 | 7/2008 | Frank |
| 7,653,554 | B2 | 1/2010 | Frank et al. |
| 7,680,677 | B2 | 3/2010 | Frank et al. |
| 2001/0010041 | A1 | 7/2001 | Harshaw |
| 2001/0018178 | A1 | 8/2001 | Siefert |
| 2001/0032189 | A1 | 10/2001 | Powell |
| 2001/0041989 | A1 | 11/2001 | Vilcauskas et al. |
| 2001/0049707 | A1 | 12/2001 | Tran |
| 2002/0032659 | A1 | 3/2002 | Waters |
| 2002/0072995 | A1 | 6/2002 | Smith |
| 2002/0077835 | A1 | 6/2002 | Hagelin |
| 2002/0095368 | A1 | 7/2002 | Tran |
| 2002/0138297 | A1 | 9/2002 | Lee |
| 2002/0178120 | A1 | 11/2002 | Reid |
| 2003/0046307 | A1 | 3/2003 | Rivette et al. |
| 2003/0171949 | A1 | 9/2003 | Degnan |
| 2003/0172020 | A1 | 9/2003 | Davies et al. |
| 2003/0191780 | A1 | 10/2003 | Heger et al. |
| 2004/0054606 | A1* | 3/2004 | Broerman ............... 705/27 |
| 2004/0059994 | A1 | 3/2004 | Fogel et al. |
| 2004/0220881 | A1 | 11/2004 | Powell |
| 2005/0021384 | A1 | 1/2005 | Pantaleo et al. |
| 2005/0210009 | A1 | 9/2005 | Tran |
| 2006/0080135 | A1 | 4/2006 | Frank et al. |
| 2006/0080136 | A1 | 4/2006 | Frank et al. |
| 2006/0085219 | A1 | 4/2006 | Frank et al. |
| 2006/0085220 | A1 | 4/2006 | Frank et al. |
| 2006/0149711 | A1 | 7/2006 | Zellner |
| 2006/0224412 | A1 | 10/2006 | Frank et al. |
| 2006/0259321 | A1 | 11/2006 | Gabrick et al. |
| 2006/0277091 | A1* | 12/2006 | Kochikar et al. ............ 705/10 |
| 2007/0073625 | A1* | 3/2007 | Shelton ............... 705/59 |
| 2007/0226094 | A1 | 9/2007 | Malackowski et al. |
| 2007/0233544 | A1 | 10/2007 | Frank et al. |
| 2008/0133338 | A1 | 6/2008 | Frank et al. |
| 2008/0154682 | A1 | 6/2008 | Frank et al. |
| 2008/0201210 | A1 | 8/2008 | Frank et al. |
| 2008/0201211 | A1 | 8/2008 | Frank et al. |
| 2009/0083109 | A1 | 3/2009 | Frank et al. |
| 2010/0332285 | A1 | 12/2010 | Dunagan et al. |

OTHER PUBLICATIONS

U.S. Appl. No. 09/750,001, filed Dec. 29, 2000.
U.S. Appl. No. 09/750,012, filed Dec. 29, 2000.
U.S. Appl. No. 09/750,136, filed Dec. 29, 2000.
U.S. Appl. No. 10/004,497, filed Dec. 6, 2001.
U.S. Appl. No. 11/026,737, filed Dec. 30, 2004.
U.S. Office Action dated Sep. 21, 2004 in U.S. Appl. No. 09/750,001.
U.S. Office Action dated May 31, 2005 in U.S. Appl. No. 09/750,001.
U.S. Office Action dated Jan. 27, 2006 in U.S. Appl. No. 09/750,001.
U.S. Office Action dated Aug. 7, 2006 in U.S. Appl. No. 09/750,001.
U.S. Office Action dated May 7, 2007 in U.S. Appl. No. 09/750,001.
U.S. Office Action dated Sep. 26, 2007 in U.S. Appl. No. 09/750,001.
U.S. Office Action dated Mar. 21, 2008 in U.S. Appl. No. 09/750,001.
U.S. Office Action dated Aug. 6, 2008 in U.S. Appl. No. 09/750,001.
U.S. Office Action dated Jan. 27, 2009 in U.S. Appl. No. 09/750,001.
U.S. Office Action dated May 11, 2009 in U.S. Appl. No. 09/750,001.
U.S. Office Action dated Sep. 3, 2004 in U.S. Appl. No. 09/750,130.
U.S. Office Action dated May 26, 2005 in U.S. Appl. No. 09/750,130.
U.S. Notice of Allowance dated Feb. 7, 2006 in U.S. Appl. No. 09/750,130.
U.S. Notice of Allowance dated Aug. 18, 2006 in U.S. Appl. No. 09/750,130.
U.S. Office Action dated Sep. 10, 2004 in U.S. Appl. No. 09/750,154.
U.S. Office Action dated Jun. 8, 2005 in U.S. Appl. No. 09/750,154.
U.S. Office Action dated Jan. 31, 2006 in U.S. Appl. No. 09/750,154.
U.S. Office Action dated Aug. 7, 2006 in U.S. Appl. No. 09/750,154.
U.S. Notice of Allowance dated May 8, 2007 in U.S. Appl. No. 09/750,154.
U.S. Examiner Interview Summary Record dated Aug. 17, 2007 in U.S. Appl. No. 09/750,154.
U.S. Office Action dated Sep. 7, 2004 in U.S. Appl. No. 09/946,457.
U.S. Office Action dated Feb. 2, 2006 in U.S. Appl. No. 09/946,457.
U.S. Office Action dated Aug. 7, 2006 in U.S. Appl. No. 09/946,457.
U.S. Notice of Allowance dated May 4, 2007 in U.S. Appl. No. 09/946,457.
U.S. Notice of Allowance dated Feb. 14, 2008 in U.S. Appl. No. 09/946,457.
U.S. Office Action dated Jul. 31, 2002 in U.S. Appl. No. 09/946,593.
U.S. Office Action dated Nov. 21, 2002 in U.S. Appl. No. 09/946,593.
U.S. Office Action dated Apr. 3, 2003 in U.S. Appl. No. 09/946,593.
U.S. Office Action dated Sep. 30, 2003 in U.S. Appl. No. 09/946,593.
U.S. Office Action dated Jul. 27, 2004 in U.S. Appl. No. 09/946,593.
U.S. Office Action dated May 31, 2005 in U.S. Appl. No. 09/946,593.
U.S. Office Action dated Jan. 27, 2006 in U.S. Appl. No. 09/946,593.
U.S. Office Action dated Aug. 7, 2006 in U.S. Appl. No. 09/946,593.
U.S. Notice of Allowance dated May 8, 2007 in U.S. Appl. No. 09/946,593.
U.S. Notice of Allowance dated Mar. 25, 2008 in U.S. Appl. No. 09/946,593.
U.S. Office Action dated Sep. 10, 2004 in U.S. Appl. No. 10/188,209.
U.S. Office Action dated Jun. 8, 2005 in U.S. Appl. No. 10/188,209.
U.S. Office Action dated Jan. 31, 2006 in U.S. Appl. No. 10/188,209.
U.S. Office Action dated Aug. 8, 2006 in U.S. Appl. No. 10/188,209.
U.S. Office Action dated Apr. 18, 2007 in U.S. Appl. No. 10/188,209.
U.S. Advisory Action dated Aug. 21, 2007 in U.S. Appl. No. 10/188,209.
U.S. Notice of Allowance dated Oct. 19, 2007 in U.S. Appl. No. 10/188,209.
U.S. Office Action dated Aug. 22, 2007 in U.S. Appl. No. 11/026,737.
U.S. Examiner Interview Summary Record dated Nov. 27, 2007 in U.S. Appl. No. 11/026,737.
U.S. Office Action dated Feb. 21, 2008 in U.S. Appl. No. 11/026,737.
U.S. Office Action dated Aug. 4, 2008 in U.S. Appl. No. 11/026,737.
U.S. Office Action dated Mar. 4, 2009 in U.S. Appl. No. 11/026,737.
U.S. Office Action dated Oct. 13, 2009 in U.S. Appl. No. 11/026,737.
U.S. Office Action dated Apr. 1, 2010 in U.S. Appl. No. 11/026,737.
U.S. Notice of Allowance dated Oct. 27, 2010 in U.S. Appl. No. 11/026,737.
U.S. Office Action dated Sep. 26, 2007 in U.S. Appl. No. 11/289,859.
U.S. Office Action dated Mar. 13, 2008 in U.S. Appl. No. 11/289,859.
U.S. Office Action dated Jul. 25, 2008 in U.S. Appl. No. 11/289,859.
U.S. Office Action dated Jan. 12, 2009 in U.S. Appl. No. 11/289,859.
U.S. Office Action dated Jul. 6, 2009 in U.S. Appl. No. 11/289,859.
U.S. Office Action dated Nov. 25, 2009 in U.S. Appl. No. 11/289,859.
U.S. Office Action dated Sep. 26, 2007 in U.S. Appl. No. 11/290,203.
U.S. Office Action dated May 30, 2008 in U.S. Appl. No. 11/290,203.

(56) References Cited

OTHER PUBLICATIONS

U.S. Office Action dated Oct. 16, 2008 in U.S. Appl. No. 11/290,203.
U.S. Office Action dated Jun. 23, 2009 in U.S. Appl. No. 11/290,203.
U.S. Notice of Allowance dated Nov. 18, 2009 in U.S. Appl. No. 11/290,203.
U.S. Notice of Allowance dated May 14, 2010 in U.S. Appl. No. 11/290,203.
U.S. Office Action dated Sep. 17, 2008 in U.S. Appl. No. 11/290,226.
U.S. Office Action dated Jun. 23, 2009 in U.S. Appl. No. 11/290,226.
U.S. Notice of Allowance dated Nov. 16, 2009 in U.S. Appl. No. 11/290,226.
U.S. Notice of Allowance dated May 7, 2010 in U.S. Appl. No. 11/290,226.
U.S. Office Action dated Sep. 19, 2008 in U.S. Appl. No. 11/290,231.
U.S. Notice of Allowance dated May 13, 2009 in U.S. Appl. No. 11/290,231.
U.S. Notice of Allowance dated Dec. 7, 2009 in U.S. Appl. No. 11/290,231.
U.S. Notice of Allowance dated Apr. 28, 2010 in U.S. Appl. No. 11/290,231.
U.S. Office Action dated Oct. 31, 2008 in U.S. Appl. No. 11/395,088.
U.S. Office Action dated Jun. 24, 2009 in U.S. Appl. No. 11/395,088.
U.S. Office Action dated Dec. 16, 2009 in U.S. Appl. No. 11/395,088.
U.S. Office Action dated Sep. 1, 2010 in U.S. Appl. No. 11/395,088.
Examiner's Answer to Appeal Brief dated May 24, 2011 in U.S. Appl. No. 11/395,088.
Patent Board Decision dated Jul. 23, 2014 in U.S. Appl. No. 11/395,088.
U.S. Office Action dated Aug. 25, 2014 in U.S. Appl. No. 11/395,088.
U.S. Office Action dated Jan. 27, 2015 in U.S. Appl. No. 11/395,088.
U.S. Notice of Allowance dated Apr. 17, 2015 in U.S. Appl. No. 11/395,088.
U.S. Office Action dated Oct. 30, 2008 in U.S. Appl. No. 11/446,091.
U.S. Office Action dated Apr. 27, 2009 in U.S. Appl. No. 11/446,091.
U.S. Notice of Allowance dated Nov. 16, 2009 in U.S. Appl. No. 11/446,091.
U.S. Office Action dated Jan. 6, 2010 in U.S. Appl. No. 12/013,196.
U.S. Office Action dated Sep. 23, 2008 in U.S. Appl. No. 12/045,329.
U.S. Office Action dated Jul. 8, 2009 in U.S. Appl. No. 12/045,329.
U.S. Notice of Allowance dated Nov. 16, 2009 in U.S. Appl. No. 12/045,329.
U.S. Office Action dated Feb. 2, 2010 in U.S. Appl. No. 12/111,558.
U.S. Office Action dated Apr. 30, 2009 in U.S. Appl. No. 12/111,569.
U.S. Notice of Allowance dated Dec. 14, 2009 in U.S. Appl. No. 12/111,569.
U.S. Notice of Allowance dated May 14, 2010 in U.S. Appl. No. 12/111,569.
U.S. Office Action dated Apr. 13, 2011 in U.S. Appl. No. 12/327,413.
U.S. Office Action dated May 3, 2011 in U.S. Appl. No. 12/633,092.
U.S. Office Action dated Apr. 28, 2011 in U.S. Appl. No. 12/642,149.
U.S. Office Action dated Aug. 25, 2011 in U.S. Appl. No. 12/642,149.
Bates, "Using Dialog's Intranet Tookit to Mine for Patent Intelligence," Quantum 2 Case Study, Leadership Series, Service Definition, Jan. 2, 2002, 5 pages.
Berkowitz, "Getting the most from your Patents," *Research-Technology Management*, 32(2): Mar./Apr. 26-31, 1993.
Bjorner, "Patent and Trademark Databases: Intellectual property for the masses (includes related article (Focus: Intellectual Property)," *Link-Up*, 9(4), 14 pages, Jul.-Aug. 1992.
Daukuviene, World Patent Information, 19(1): 41-46, 1997.
Dictionary.com. Intellectual property definition, printed May 24, 2005.
Ganguli, World Patent information, 17(4): 245-256, 1995.
Hufker et al., "Patents: A Managerial persepective," *Journal of Product & Brand Management*, 3(4): 44-54, 1994.
Iandiorio, "Patents and Copyrights: Protecting intellectual property," *Microwave Journal*, 35(4):30-37, Apr. 1991.
Kempner, et al., "Many a slip," *Managing Intellectual Property*, v7 n42, pp. 15-26, Sep. 1994.
Kimmerling, "A Licensing Primer for Trainers," *Training & Development*, 51(1):30-35, Jan. 1997.
McQueen, Technovation, V. 23, pp. 533-544, 2003.
Murray, "HR takes steps to protect trade secrets," *Personal Journal*, 73(6): 98-109, Jun. 1994.
Schoch-Grubler, World Patent Information, 20(1):21-27, 1998.
Wineburg, et al. "Managing Intellectual Property—An international capital asset," *Commercial Law Journal*, 99(3):366-383, Fall 1994.
"The Evolution of the Post-it® Note," www.3m.com/us/office/postit/pastpresent/history_t1.html, printed Apr. 16, 2007, 2 pages.
The Dialog Corporation, "Applying the power of dialog intranet toolkit: Focus on Pharmaceuticals," Search Aid: Dialog Intranet Toolkit, Jun. 2001, 7 pages. http://support.dialog.com/searchaids/dialog/pdf/toolkit.pdf.
Thomson Dialog, "Dialog Intranet Toolkit: Instructional Guide", 1999, 27 pages. http://gep.dialog.com/gep_resources/products/toolkit_guide.pdf.

\* cited by examiner

600

605

From: Corporate Intellectual Property Department
To: Mr. John Smith ("j.smith@ company.com")
Subject: Request for Intellectual Property Value Facilitation Task Dear Mr. Smith, 610 → Please recall that you are an inventor on U.S. Pat. No. 8,235,678. At periodic times, we request that inventors and others with specialized knowledge in the specific areas of our intellectual property assets perform tasks that help us obtain maximum value from these assets. Accordingly, please consider performing the following task.

620 → Please review the patent again and provide any thoughts you may have regarding potential infringers that you may know about. No research is requested at this time, though it is not discouraged.

630 → You may reply to this e-mail with a message that indicates that you have reviewed the patent again and that includes your thoughts regarding potential infringers. You may also provide this information
640 → through our website interface for this patent at www.ipvalfacilitate.com/8235678.htm.

650 → When your submission is reviewed and validated, we will reward you with additional compensation accordance with our policy.

Thank you.

FIG. 6

POTENTIAL REALIZATION SYSTEM WITH ELECTRONIC COMMUNICATION PROCESSING FOR CONDITIONAL RESOURCE INCREMENTATION

CROSS-REFERENCE TO RELATED APPLICATIONS

This application is a continuation of and claims priority to U.S. patent application Ser. No. 11/395,088, now U.S. Pat. No. 9,129,252, filed Mar. 31, 2006, the content of which is herein incorporated by reference in its entirety.

TECHNICAL FIELD

The present disclosure is generally related to electronic communications and is more particularly related to analysis of electronic communications.

BACKGROUND

Many types of entities, including artificial intelligence entities and others types of entities, have untapped potentials, including underutilized capabilities and opportunities. In addition, those potentials are often of many different types and of diverse natures. Realizations of such potentials can often be difficult to implement or facilitate. For example, many potentials are dormant or remain unnoticed, i.e., hidden, while others are complex and non-intuitive. Consequently, entities attempting to realize such potentials solely through internal processing are often met by failure. In addition, previous types of processing are often inadequate for thorough and effective facilitation of complex potential realization needs.

Thus, heretofore unaddressed needs exist in the industry to address the aforementioned deficiencies and inadequacies, as well as address other issues not mentioned above.

SUMMARY

Selected embodiments of the present disclosure provide methods, systems and media for systematically processing electronic communications for conditionally incrementing resources. In certain embodiments, electronic communications are received and processed in order to evaluate potential realization assistance functions by potential realization assistants according to processes that include resource incrementations that are conditioned on satisfactory potential realization function processing.

Other methods, features, devices, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 is a partial screen shot of an electronic communication regarding a value facilitation task for a value facilitator, in accordance with one embodiment of the present disclosure.

DETAILED DESCRIPTION

Figure 1:
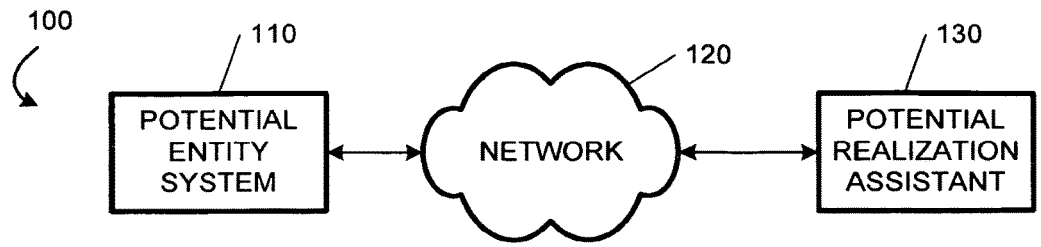
FIG. 1 is a high level block diagram representation of one embodiment, among others, of the present disclosure, of a generalized potential realization system.

Many aspects of the present disclosure can be better understood with reference to the following drawings. The components in the drawings are not to scale, emphasis instead being placed upon clearly illustrating the principles of the present disclosure. Moreover, in the drawings, like reference numerals designate corresponding parts throughout the several views. While several embodiments are described in general and in connection with these drawings, there is no intent to limit the disclosure to the example embodiments and implementations disclosed herein since the examples are intended to be considered among other examples that will be understood. On the contrary, the intent is to also cover alternatives, modifications, and equivalents.

There are many types of untapped potentials and underutilized capabilities and opportunities in many different types of entities, all of which are intended to be with the scope of the present disclosure. Selected embodiments of the present disclosure provide methods, systems and media for systematically processing electronic communications for conditionally incrementing resources. In certain embodiments, electronic communications are received and processed in order to evaluate potential realization assistance functions by potential realization assistants according to processes that include resource incrementations that are conditioned on satisfactory potential realization function processing. Furthermore, certain embodiments include intelligent processes for assigning assistants based upon workload balancing and subject matter factors, and certain embodiments include a plurality of stages of potential realization activities for each potential. In one example, among others, a business entity, such as a corporation, has untapped potentials and unrealized value in the form of intellectual property assets that are underutilized. In accordance with one implementation of that example with regard to patent assets, a system is provided for communicating with inventors to manage and reward (i.e., increment resources for) their activities that qualify as validated value facilitation activities, or potential realization functions. Some embodiments are completely automated, while others include varying levels of human involvement.

The effectiveness of any intellectual property legal system in any country in the world is dependent in some part on the ability of all intellectual property owners in that system to establish and obtain value from their valid intellectual property rights. While legal systems often provide adequate protection environments, many intellectual property owners are unable to benefit from such environments to prevent infringement of their intellectual property rights in order to receive value from those intellectual property rights. While some instances of intellectual property infringement are readily apparent, others can continue for years without being detected. The consequential financial losses to those intellectual property owners can be staggering. In addition, the overall intellectual property system itself is also damaged by such ongoing infringements since, as mentioned above, the effectiveness of the entire intellectual property system depends on the ability of all intellectual property owners to not only establish, but also to obtain value from their valid intellectual property rights.

Unfortunately, many intellectual property owners are not even aware of the real possibility of undetected infringements. Furthermore, many of the intellectual property owners who are actually aware of the possibility of undetected infringements do not fully realize the need for detecting such infringements or are unable to develop an efficient and effective process for detecting such infringements. Moreover, even when infringements are detected, many intellectual property owners are unable to satisfactorily stop such infringements, resulting in the loss of enormous potential value from intellectual property assets.

Through at least one embodiment of the present disclosure, owners of intellectual property assets are able to efficiently and effectively obtain value from those assets by utilizing a computer system that manages an efficient and effective process of providing rewards to intellectual property value facilitators, such as inventors, engineers, etc., among others, who accomplish a plurality of value facilitation tasks. In one example implementation of such a system, a corporate owner of intellectual property assets is able to overcome many of the problems associated with realizing value from corporate intellectual property assets. Such an implementation, through electronic communications, such as website communications, electronic mail communications, instant messaging communications, etc., systematically communicates reward opportunities to employees with correlated expertise in specific areas that are particularly relevant to identified intellectual property assets, receives resulting information after such tasks are performed by the employees, and provides rewards to the employees after the tasks are validated. This embodiment and others included within the scope of this disclosure are discussed in greater detail below.

While other embodiments and implementations are also considered to be within the scope of the present disclosure, as discussed below, benefits to this particular implementation and embodiment clearly include a greater likelihood that intellectual property owners will realize maximum value from their intellectual property assets, which also helps strengthen the intellectual property legal system in which that intellectual property owner participates. While some companies may reward employees for assisting in the creation of intellectual property and may even have employees dedicated to marketing and licensing intellectual property, this example implementation provides a system in which those who have greater amounts of knowledge and experience in particular subject matter areas have incentives and convenient, efficient and continued opportunities to participate in obtaining value from intellectual property assets.

Refer now to the FIG. 1, which shows a high level block diagram representation of a generalized potential realization system 100 that includes a potential entity system 110 (i.e., a system of an entity having at least one potential), a network 120, and a potential realization assistant 130. Broadly speaking, principles and teachings of the present disclosure can be applied to a variety of potentials in a variety of environments. In one particular group of embodiments, as primarily discussed herein, value (one type of realization of potential) is obtained from intellectual property assets (one type of potential), but it should be understood that, in addition to other types of potentials and other types of potential realizations, value can also be obtained from other types of assets (e.g., conventional tangible and intangible assets, among others) utilizing the broader aspects of the principles of the present disclosure, as will be understood by those reasonably skilled in the art. Furthermore, elements of certain embodiments of the present disclosure, such as the potential realization assistant 130, among others, should be understood to include, in various embodiments, completely computerized systems, including those involving only one computing device or multiple computing devices performing asset management and value facilitation functions, as well as systems involving human interaction. For example, in some embodiments, the functions of the potential realization assistant 130 are performed entirely by automatic logic in at least one computer system, whereas other embodiments include at least one human providing input through a facilitator computing device. In one example implementation directed toward intellectual property, as discussed above as one example among others, a patent inventor employee of a corporation operating a computing device embodies one example of the potential realization assistant 130, while the network 120 can be implemented as a corporate network, public network or a combination of both, as acceptable examples, among others, and the potential entity system 110 can be implemented as an enhanced intellectual property management system owned or used by an entity, such as a corporation, among others, that also owns or can benefit from the intellectual property assets being managed. In addition, the potential realization assistant 130, as well as other elements shown as single elements throughout the figures, are representative of multiple similar elements in various embodiments. Also, other embodiments do not include a network 120 separating the potential realization assistant 130 from the potential entity system 110.

Figure 2:
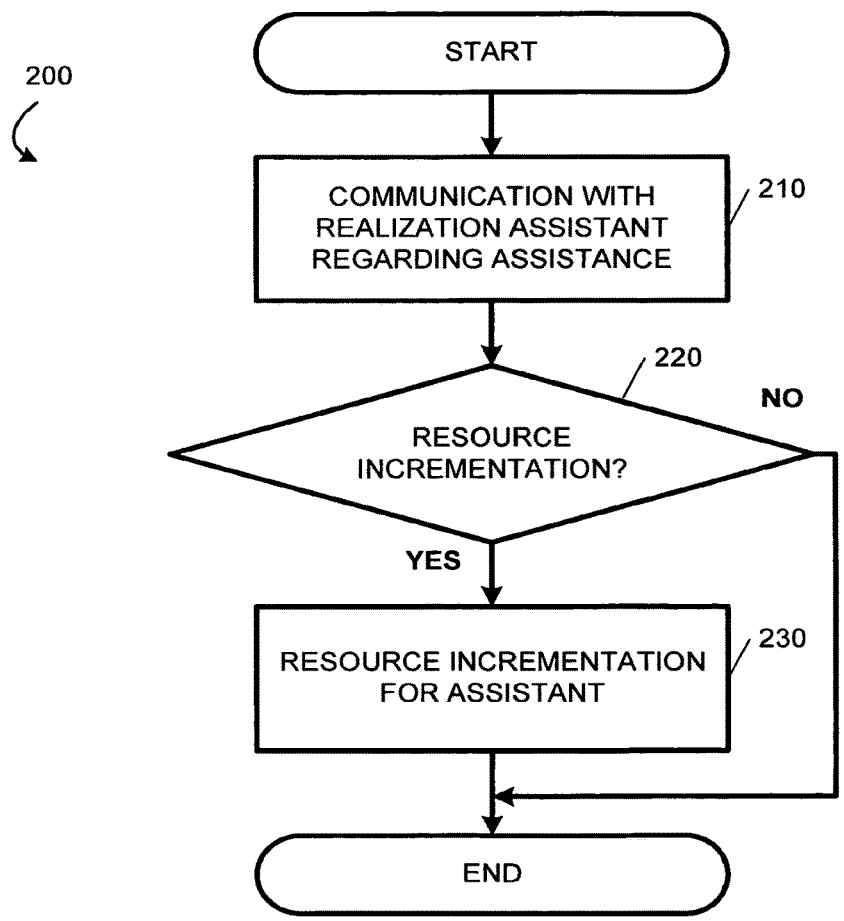
FIG. 2 is a high level flow chart representation of a generalized process for potential realization, in accordance with the generalized embodiment show in FIG. 1.

Refer now also to FIG. 2, which shows a high level flow chart representation of a generalized potential realization process 200, in accordance with the generalized potential realization system embodiment 100 shown in FIG. 1. The process 200 includes, as indicated by step 210, communication with a potential realization assistant 130 regarding potential realization assistance. As discussed in more detail below, in some embodiments, such communication includes an electronically communicated request from the potential entity system 110 to a potential realization assistant 130 to perform a potential realization assistance task, such as a value facilitation task, among others, as well as responsive electronic communication regarding the task, such as information resulting from the performance of the task. As further discussed below, other embodiments do not include a request being communicated to a potential realization assistant 130 as an initial communication step, but instead include, as one example among others, a potential realization assistant 130 requesting permission to perform a task, after which permission may be selectively granted and communicated to the potential realization assistant 130 after analysis of the request. Furthermore, other example embodiments, among others, do not include requests for tasks to be performed or requests for permission to perform a task, but instead respond to unsolicited submissions from previously unknown potential realization assistants 130 who have already performed unsolicited potential realization assistance tasks. Accordingly, in some of those embodiments, a website (or other interface) is provided through the Internet (or other network) to receive information from virtually anyone, or anything or processing entity, resulting from such unsolicited potential realization assistance tasks. In addition, some of those embodiments are not limited to receiving information regarding potentials (including assets, among other acceptable potentials) owned or controlled through entities associated with the website.

After communication regarding potential realization assistance takes place in step 210, the process 200 continues in step 220 to determine whether a resource incrementation for the potential realization assistant 130 is in order. In one embodiment, among others, this determination includes an evaluation of information resulting from completion of a value facilitation task. Some embodiments include electronically communicating such information to another employee of a corporation who functions as an authorizer by validating the completion of the task and authorizing a reward (resource incrementation) for the value facilitator. Other embodiments include computer logic for performing such functions (among others) without human interaction. Still other embodiments perform no analysis, but simply provide a reward to the value facilitator as soon as the value facilitator provides some indication that the task is complete or when it is otherwise determined that at least part of the task has been performed. If criteria for resource incrementation are satisfied, the potential realization assistant 130 receives a resource incrementation, such as additional resources or an enhancement to existing resources, among others, as indicated in step 230. Such resource enhancement may include the generation of information and further communication authorizing the resource enhancement, among other acceptable examples. If resource incrementation is not appropriate, the potential realization assistant 130 is not rewarded. In some embodiments, after an authorizer provides an indication of authorization, an electronic communication is provided to an administrator who then interacts with a reward disbursement system, such as through a computer system, to cause a reward to be provided to the potential realization assistant 130, such as an increase in an employee paycheck through a corporate payroll system. Other embodiments include other reward schemes that include point systems and other processes for providing transfer of value in exchange for the performance of a value facilitation task. Other forms of reward also include intangible benefits, such as entries in personnel folders complimenting employees, etc. Still other embodiments include more completely computerized environments where processing entities, such as robots, software entities, or artificial intelligence entities, among others, receive resource incrementations in the form of energy, memory, or additional functionalities or abilities, among others, in exchange for providing potential realization assistance for a similar or other type of entity, such as through enabling or facilitating use of untapped, unavailable, broken, or underutilized potentials. Other potentials included within the scope of the present disclosure include any type of trespass event or violation of any rights of an entity, including those causing injuries, among others, since an opportunity for financial recompense may exist, and embodiments of the present disclosure may be used to provide assistance in realizing such potentials.

Figure 3:
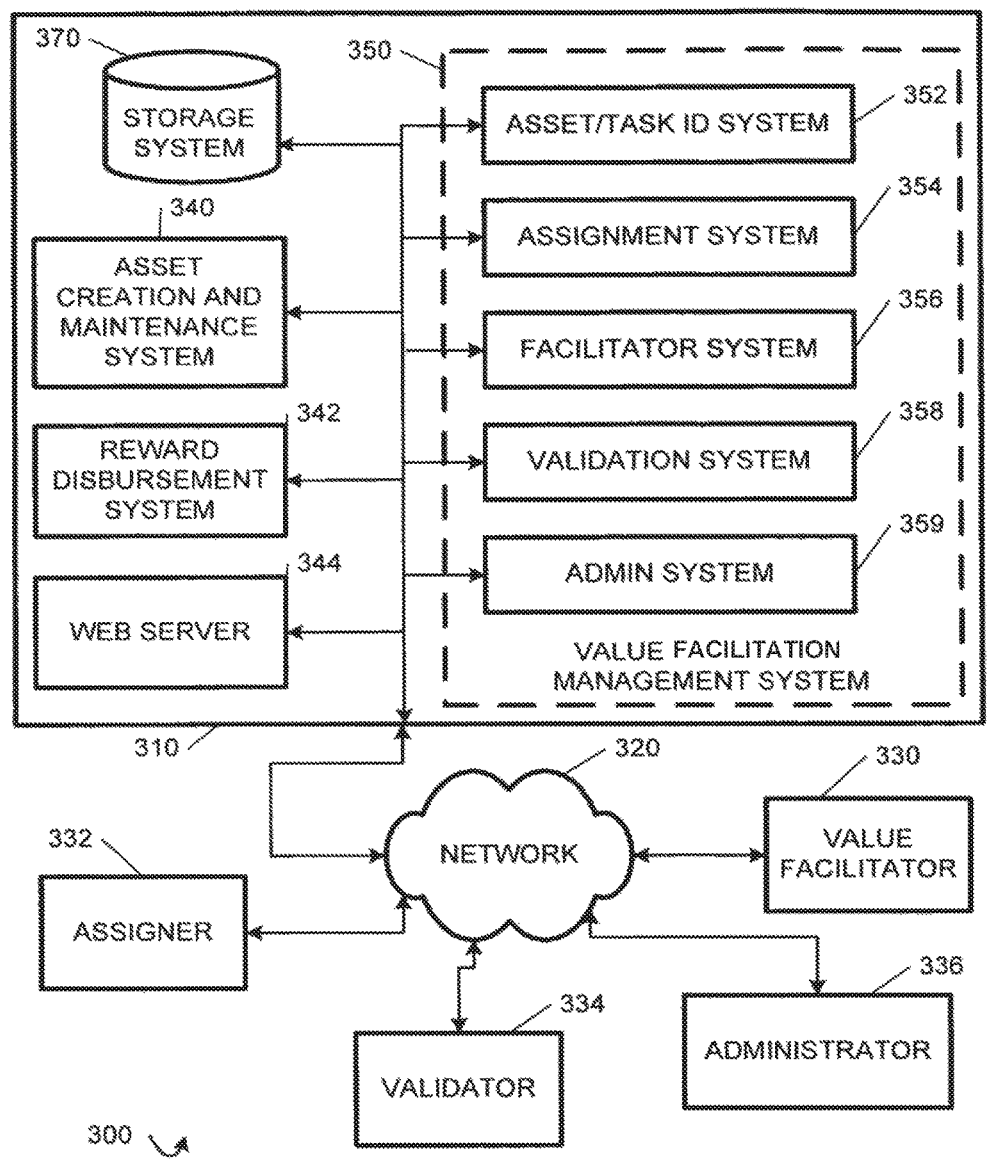
FIG. 3 is a more detailed block diagram representation of an example implementation of one embodiment of FIG. 1.

Refer now to FIG. 3, which shows a more detailed block diagram representation of an example implementation of one embodiment of FIG. 1. An asset utilization system 300 is shown including an asset system 310 connected through a network 320 to a value facilitator 330, an assigner 332, a validator 334, and an administrator 336. The asset system 310 is shown including an asset creation and maintenance system 340, a reward disbursement system 342, a web server 344, a value facilitation management system 350, and a storage system 370. The value facilitation management system 350 is shown including an asset/task identification (ID) system 352, an assignment system 354, a facilitator system 356, a validation system 358, and an admin system 359, each of which can be embodied in a separate computer system or as programming logic (modules, programs, etc.) in one or more computer systems standing separately or integrated into the asset creation and maintenance system 340. Other functions of the value facilitation management system 350 discussed herein are performed by additional programming or logic not illustrated as a distinct block. The network 320 includes, in one embodiment, a global computer network, such as the Internet, and any connected computer network and/or telecommunications network, including any wired or wireless network, mobile network, WAN (Wide Area Network), LAN (Local Area Network) or MAN (Metropolitan-area network). In other embodiments, the network 320 is located inside a corporate environment, providing no outside access through the Internet.

Figure 4:
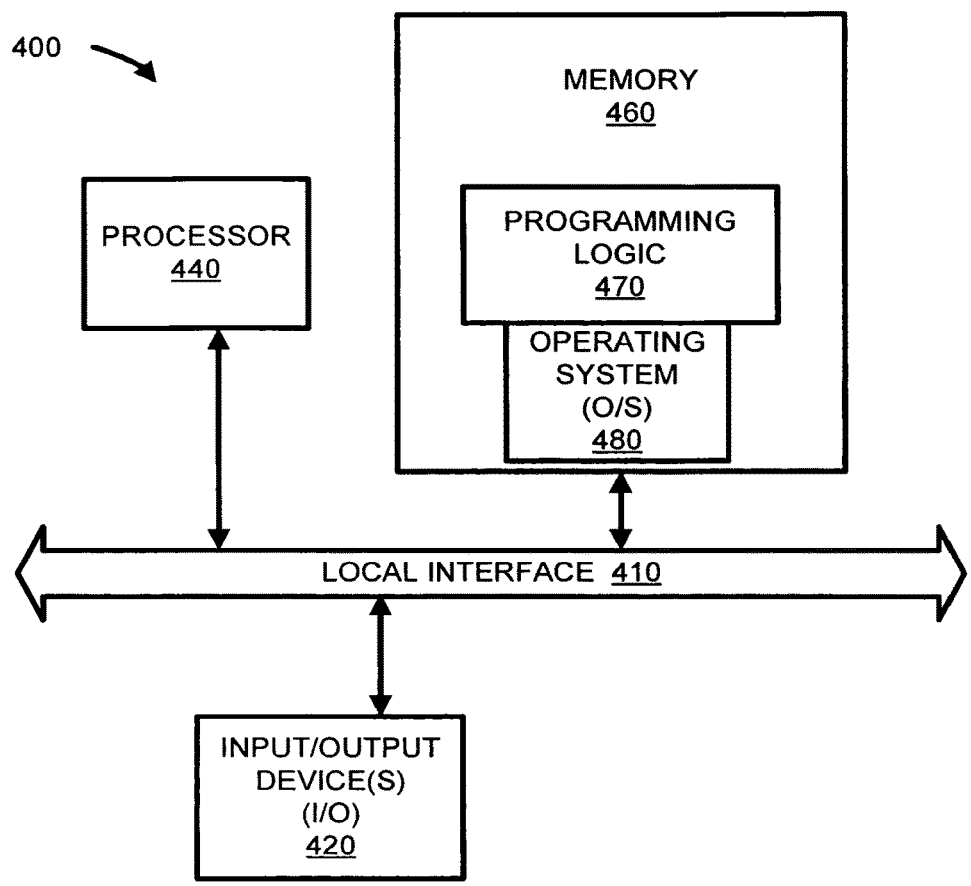
FIG. 4 is a block diagram representation of a general purpose computer system with implementation specific program logic, in accordance with one embodiment of the present disclosure.

In various embodiments, each of the elements shown in FIG. 3, other than the network 320, is embodied in one or more computing devices including programming logic for performing the functions discussed herein. In a portion of those embodiments, users interact with those computing devices to assist in accomplishing such functions. In addition, the elements of the asset system 310 can be embodied in one or more computing devices, with or without user interaction, in various embodiments. FIG. 4 shows an example computing device (computer) 400 that represents one embodiment of such computing devices, though there is no intention to limit the present disclosure to any particular type of computing device. As shown, example computing device 400 includes a processor 440, memory 460, and one or more input and/or output (I/O) devices 420 (or peripherals) that are communicatively coupled via a local interface 410. The local interface 410 can be, for example but not limited to, one or more buses or other wired or wireless connections, as is known in the art. The processor 440 is, in one embodiment, a hardware device for executing (or interpreting) software, particularly that stored in memory 460. The memory 460 includes any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 460 may incorporate electronic, magnetic, optical, and/or other types of storage media. Note that the memory 460 can also have a distributed architecture, where various components are situated remote from one another, but can be accessed by the processor 440.

The software in memory 460 includes multiple separate programs, represented as programming logic 470, each of which comprises an ordered listing of executable instructions for implementing logical functions, for example, to provide the various functions discussed herein. As shown, the software in the memory 460 includes programming logic 470 and operating system (O/S) 480. The operating system 480 controls the execution of other computer programs, such as the programming logic 470, and provides scheduling, input-output control, file and data management, memory management, and communication control and related services. The I/O devices 420 may include input devices, for example but not limited to, a keyboard, mouse, scanner, microphone, etc. Furthermore, the I/O devices 420 may also include output devices, for example but not limited to, a printer, display, etc. Finally, the I/O devices 420 may further include devices that communicate both inputs and outputs, for instance but not limited to, a modulator/demodulator (modem; for accessing another device, system, or network), a network access device, a radio frequency (RF) or other transceiver, a telephonic interface, a bridge, a router, etc. If the computer 400 is a personal computer (PC), workstation, server, or the like, the software in the memory 460 may further include a basic input output system (BIOS). The BIOS is a set of software routines that initializes and tests hardware at startup, starts the O/S 480, and supports the transfer of data among the hardware devices. The BIOS is stored in ROM so that the BIOS can be executed when the computer 400 is activated. When the computer 400 is in operation, the processor 440 is configured to execute software stored within the memory 460, to communicate data to and from the memory 460, and to generally control operations of the computer 400 pursuant to the software. The programming logic 470 and the O/S 480, in whole or in part, are read by the processor 440, and perhaps buffered within the processor 440, and then executed.

Each of the elements of FIG. 3 will now be described in more detail and in an example context of an intellectual property asset value facilitation environment. While obtaining value from patent assets is discussed as an example, other embodiments include obtaining value from other types of intellectual property assets, as well as other types of assets other than intellectual property, as referenced above. Other examples of intellectual property include assets arising from copyright, trademark, and trade secret rights, among others. In addition, intellectual property asset implementations are not limited to issued patents, but can also include obtaining value from pending patent applications or potentially patentable embodiments, as well as other assets related to other forms of intellectual property in various stages of their protection life cycles. Thus, functions and elements discussed below in the context of issued patents are intended to apply to other types of assets as well in other implementations. In one example embodiment, the value facilitation management system 350 is connected through at least one internal corporate network to the asset creation and maintenance system 340, the reward disbursement system 342, the web server 344, and the storage system 370. In some embodiments, while each of the systems of the asset system 310 include data storage systems, including databases, table structures, etc., for use in performing the functions outlined herein, the storage system 370 is representative of storage that various systems may also utilize. In other embodiments, the storage system 370 is the primary storage facility for various systems within the asset system 310. Still other embodiments include no centralized storage capabilities, with each of the various systems including their respective storage systems. Thus, records in various databases are linked together through mapping in some embodiments to enable virtual packets of information to be assembled from disparate systems so that a broader view of associated information can be produced for a user.

In one embodiment, the value facilitation management system 350 interacts with the storage system 370, asset creation and maintenance system 340, and reward disbursement system 342 to send and receive data through web server 344 and network 320 to users (through user computers) represented by assigner 332, validator 334, administrator 336, and value facilitator 330. In one embodiment, the web server 344 formats data into (and interprets data received in) HTML (Hypertext Markup Language), or any other format that can be interpreted by users, for transmission through the network 320 to users. Web server 344 utilizes HTTP (HyperText Transfer Protocol), as well as other protocols, to communicate HTML data to and from user devices. In one embodiment, web server 344 also executes scripts and other programs to serve (transmit to users) static and dynamically generated web pages based upon statically stored and dynamically generated data, including data dynamically received from the value facilitation management system 350, the storage system 370, the asset creation and maintenance system 340, and the reward disbursement system 342. User computing devices also include web browsing programming, such as browser software, one example of which is Microsoft®. Internet Explorer, among others. In other embodiments, other methods of communication are utilized, including electronic mail (e-mail), instant messaging, etc., as well as data manipulation through Remote access, such as through Remote Desktop Connection, among others, can also be provided for users to directly manipulate database information through the value facilitation management system 350. Of course, in such embodiments, user computers also include any additional client software for accomplishing such communications. In addition, application servers and additional software and components (not shown) are also included within the asset system 310 in other embodiments in order to accomplish the various functions referenced herein. Embodiments are also included wherein multiple servers are performing similar functions, such as web serving, among others, and additional load balancing servers are used to spread the load across the multiple servers.

Figure 5:
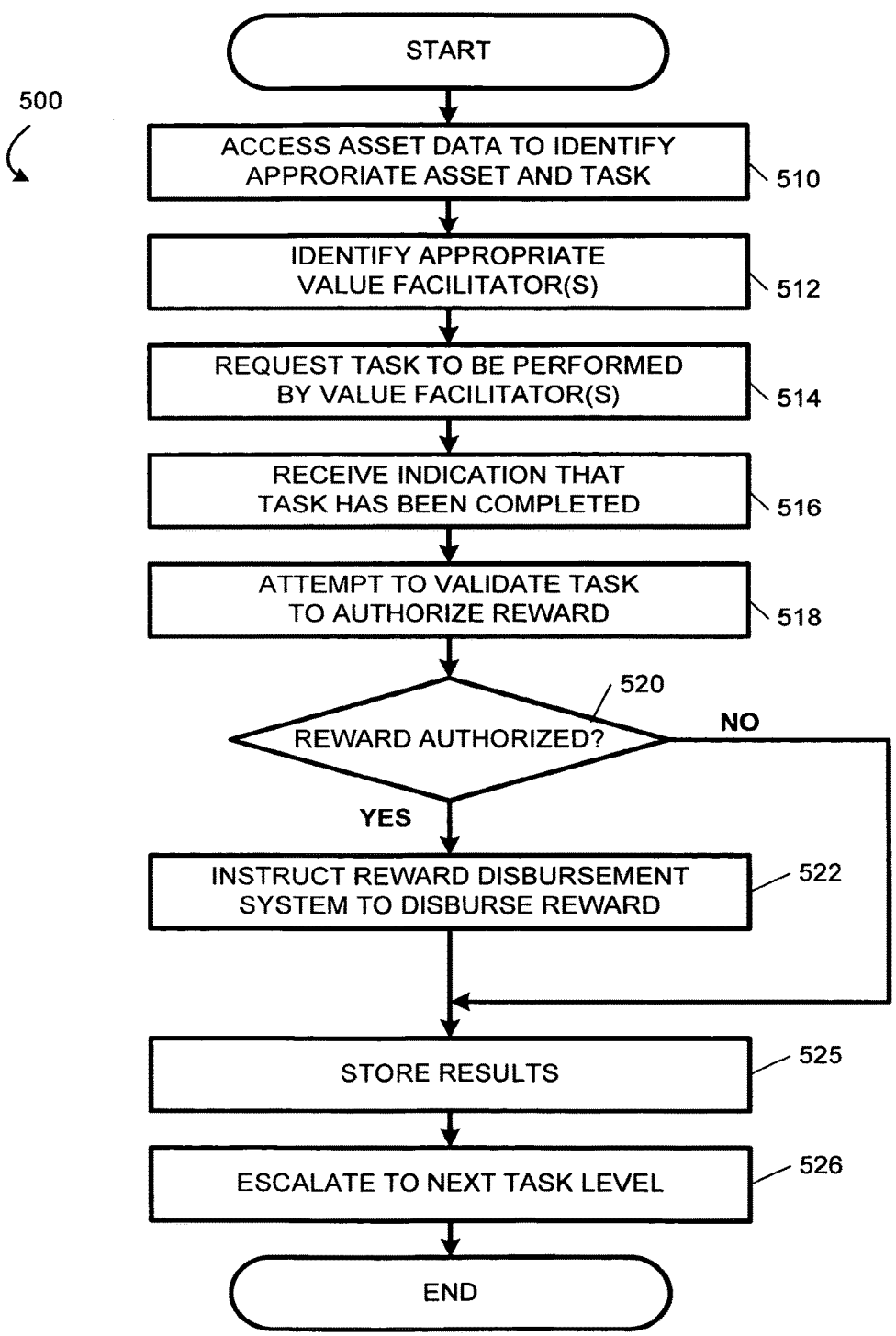
FIG. 5 is a more detailed flow chart representation of a process of the example implementation shown in FIG. 3.

With continuing reference to FIG. 3, refer also to FIG. 5, which shows a flow chart representation of a process 500 of the example implementation shown in FIG. 3. As indicated by step 510, asset data is accessed by the asset/task ID system 352 to identify an appropriate asset and value facilitation task. In an intellectual property implementation, records in at least one database corresponding to intellectual property assets are created and maintained by the asset creation and maintenance system 340. At least one example of such a system, in accordance with at least one embodiment, among others, is disclosed in U.S. patent application Ser. No. 10/330,354, filed Dec. 30, 2002, entitled "Systems and Processes for Technology Asset Management," which is incorporated herein by reference in its entirety. In one embodiment, a system that maintains intellectual property asset management information, such as patent number, maintenance fee due dates and other relevant dates, inventor contact information, etc., also maintains information about value facilitation tasks and stages of the tasks. In other embodiments, the task data is maintained in separate associated databases or data structures which, in some embodiments, are maintained by the value facilitation management system 350. Similarly, in various embodiments, data regarding stages of the tasks can also be maintained separately from the asset creation and maintenance system 340 or integrated therein. Furthermore, portions of step 510 can alternatively be illustrated as separate steps since identifying a patent, for example, for value facilitation may be handled separately from determining a value facilitation task for that patent. For example, in some embodiments, task identification can also involve interaction with a user, such as administrator 336, who provides information that further (or completely) defines a next value facilitation task for the patent. In some embodiments, any interaction with the administrator 336 is handled by, or in conjunction with, the admin system 359. The description of such a task, including reward definitions and amounts, limitations on the choice or qualifications for potential value facilitators, etc., can be saved and stored as part of a separate process that takes place before the process otherwise shown in FIG. 5 takes place. In an embodiment with such a preceding process, an administrator 336 would be enabled to define tasks as associated with a particular patent through an interface that stores information regarding the tasks, including their relationship to other tasks and their association with one or more patents or other intellectual property assets.

Examples of tasks that can be performed in one implementation of an intellectual property value facilitation process as it pertains to an issued patent include the following. A first example task, or "task level", includes a simple review of known information regarding the issued patent asset, including the value facilitator 330 submitting any comments the value facilitator 330 may have that may assist in the obtaining of value from the issued patent, such as identification of any potential infringers of the patent that the value facilitator 330 may just happen to know about, among other potential comments. Research is not requested as part of this task, though it is not discouraged if the value facilitator 330 wishes to perform research. Since the value facilitator 330 may have no thoughts that may assist in the value facilitation process, including knowledge of potential infringers, there may also be no comments at this stage. Thus, in one example, a value facilitator 330 may simply indicate that while there are no comments, the patent was reviewed, and the value facilitator 330 considered whether providing comments would be useful. In some respects, this first example task can be characterized as a broad or high level review. This first example task can be further characterized as a set, predefined, or static, task since there is no need, in some embodiments, for an administrator 336 to alter, or supplement, the definition of the task. Nonetheless, other embodiments include providing an administrator 336 an interface into the task definition to make changes that are either global, i.e., applied to all patents, and/or that are applied to one or a select group of patents.

A second example task, or task level, can be characterized as a more detailed review and includes researching other sources of information regarding potential value facilitation opportunities (e.g., identifying potential infringements of the patent) and providing a more detailed report regarding the results of the research. In some embodiments, areas and sources of information to be researched may also be designated as part of the task. As discussed above, an administrator 336 is provided an interface in such embodiments to be able to edit the definition of this task by so identifying such potential sources of information. Requirements for the report that should be submitted may also be the subject of the predefined task definition, and in some embodiments, can be altered, supplemented, or supplied completely through administrative input. In addition, minimum amounts of time spent on research, as well as report length and other specifications can be included in the definition. Potential sources of information include the World Wide Web, printed subject matter, and trade shows. The printed matter may be designated as available from a particular source, including inside and outside of an organization, such as a corporation.

A third example task, or task level, involves comparing one or more claims of a patent to one or more specified potential infringements. For example, a particular product identified in a first example task level or a second example task level may be considered during this analysis. Of course, some embodiments include using the same value facilitator 330 throughout the various tasks, but other embodiments include using different value facilitators 330 for one or more different tasks for the same patent. Furthermore, some levels of tasks may be combined with other levels of tasks in some embodiments. In addition, some tasks may be skipped or rendered unavailable in some embodiments. For example, if a potential infringement is determined during the first example task discussed above, there may be no need for performance of the second example task since additional research may not be needed at that point. Thus, in a sense, the second example task is a conditional task that depends on the outcome of the first example task.

A fourth example task, or task level, includes providing assistance in the development of an offer for a license for the patent. The exact type of assistance for this task can be defined by an administrator 336 and can include reviewing previous licensing offers, reviewing standard licensing rates and terms for the industry sector specific to the patent, outlining why a potential licensee should seriously consider the offer, among others. A fifth example task, or task level, includes participating in negotiations with a potential licensee for the patent. Such a value facilitation task could include preparing for, and attending, meetings with potential licensee representatives. Finally, a sixth example task, or task level, includes participating in litigation. Such activities could include assisting attorneys in preparing for litigation, participating in depositions, testifying in court, serving as an expert witness, etc. For the embodiments in which administrative input is enabled for defining tasks, it is generally more likely that administrative input would be provided for the fourth, fifth and sixth levels than for the first, second and third levels because of the higher variability for the fourth, fifth and sixth levels.

Continuing with the process referenced by step 510 in FIG. 5, identifying the appropriate asset, such as the appropriate patent, can include systematically (and periodically) going through all of the patents in the asset creation and maintenance system 340, or going through only a subset of patents that have been marked, such as by an administrator 336 in the asset creation and maintenance system 340, as being ready for the value facilitation process 500 of FIG. 5. Thus, after the value facilitation process 500 is performed for one patent, the value facilitation process 500 is repeated for the next patent in the list or in the entire asset creation and maintenance system 340. Other embodiments include the use of triggers in the asset creation and maintenance system 340 to prompt the initiation of the facilitation process 500. For example, one or more date triggers could be set in a database record for a particular patent maintained by the asset creation and maintenance system 340 to communicate with the value facilitation management system 350 to initiate the value facilitation process 500 for that particular patent. In one implementation, event-based triggers include the payment of an issue fee or a maintenance fee for a patent, among others. State machine programming could be used to implement this particular triggering arrangement in the asset creation and maintenance system 340.

The scope of this disclosure also includes other types of asset management triggers that could prompt initiation of the value facilitation process 500. For example, date-based triggers initiate the value facilitation process 500 in some implementations, such as passage of an issue date for a patent. In some embodiments, the value facilitation process 500 initiation communication from the asset creation and maintenance system 340 to the value facilitation management system 350 is handled without user interaction. However, in other embodiments, an administrator 336 is needed to approve the initiation of the process. Furthermore, some of those embodiments instead include a communication from the asset creation and maintenance system 340 to the administrator 336 indicating that the value facilitation process 500 should be initiated, at which point the administrator 336 manually begins the value facilitation process 500 for that patent. Still other embodiments, among others, include an administrator 336, without any prompting by the asset creation and maintenance system 340, initiating the value facilitation process 500 by manually identifying for the value facilitation management system 350 a patent to be the subject of the value facilitation process 500. As discussed above, in one implementation, after a patent is identified, the next value facilitation task for that patent is determined by the asset/task ID system 352 of the value facilitation management system 350. Since there are a series of value facilitation tasks (task levels) to be performed for an asset, such as a patent, each successful pass through the value facilitation process 500 for a particular patent may regard a different task in the series, in some implementations.

Subsequently, as indicated by step 512, an appropriate value facilitator 330 is identified by the assignment system 354. In the implementation shown in FIG. 3, the assigner 332 interacts with the assignment system 354 to identify the value facilitator 330. As with other user interactions and communications discussed in the present disclosure, such interaction can take place through a web page interface, e-mail messaging, instant messaging, direct or remote access into an application interface, among others. In one implementation, there is one user designated as the assigner 332, one user designated as the validator 334, and one user designated as the administrator 336. However, one or more users can also perform multiple roles, e.g., the administrator 336, assigner 332, and validator 334, and in one implementation, all of those roles are performed by a single user. In some other embodiments, a database of potential assigners is maintained by the assignment system 354 so that an appropriate assigner 332 can be selected, based on subject matter area, skill sets of the potential assigners 332, assignment workload balancing, among others, and then notified that a particular value facilitation task for a particular patent needs to be assigned. In other embodiments, the assigner 332 does not exist, and the assignment system 354 is more automated, though in some of those embodiments, an administrator 336 may still interact with the assignment system 354 to initiate, configure or maintain the automated assignment process. In one such implementation, one or more inventors on the patent are automatically chosen to be the first value facilitators 330 for a patent. Subsequent value facilitators 330, and in some embodiments, the first value facilitators 330, are selected through use of a database (or other memory structure) of potential value facilitators. Such a database of potential value facilitators can be maintained by the assignment system 354 and include information regarding, among others, the subject matter areas of expertise and current assignments (workloads) for each potential value facilitator 330. Accordingly, in some embodiments, the assignment system 354 is programmed to compare the subject matter area of a particular patent to the subject matter areas of expertise for the potential value facilitators 330 in order to identify an appropriate value facilitator 330. Likewise, load balancing of the workloads of the potential value facilitators 330 can be performed so that workloads are spread out more evenly. In some implementations, value facilitators 330 may have no specialized knowledge or association with a patent or patented technology. In one implementation, key words can be used in the potential value facilitator database to define the areas of expertise, and those key words can be compared to key words assigned to, or derived from, the patent for which a value facilitator 330 is being assigned. In yet other embodiments, there is no separate value facilitator 330 for one or more value facilitation tasks, and the value facilitation system 350 performs such value facilitation tasks automatically, and in some of those embodiments, as configured by an administrator 336. Thus, some embodiments include in step 512 an identification of an automated value facilitation process as one potential value facilitator 330 in the analysis of whether to assign a value facilitation task to a user or to such a process, while other embodiments automatically assign certain value facilitation tasks to processes without making such a comparative determination.

Step 514 indicates that a request is subsequently made for the value facilitation task to be performed as part of the value facilitation process 500. In one implementation, a message, such as the partial screen shot representation of the request 600 represented in FIG. 6, is generated by the facilitator system 356 and transmitted to an assigned value facilitator 330. With additional reference now to FIG. 6, the request 600 is one example of a communication that may be sent through a communication system, e.g., e-mail, instant message, etc., to a value facilitator 330. In this particular example, the value facilitator 330 is shown as Mr. John Smith, and the patent at issue is fictional example U.S. Pat. No. 8,235,678. Value facilitator contact information 605 and patent number 610 are examples of asset information derived from the asset creation and maintenance system 340. A value facilitation task description 620 is also included in the request, and in this example, indicates an example first level task, as described above. An e-mail reply invitation 630 is provided that indicates that the value facilitator 330 may simply reply to the e-mail message with a message that includes an indication that he reviewed the patent and includes any thoughts he has regarding potential infringers.

Figure 7:
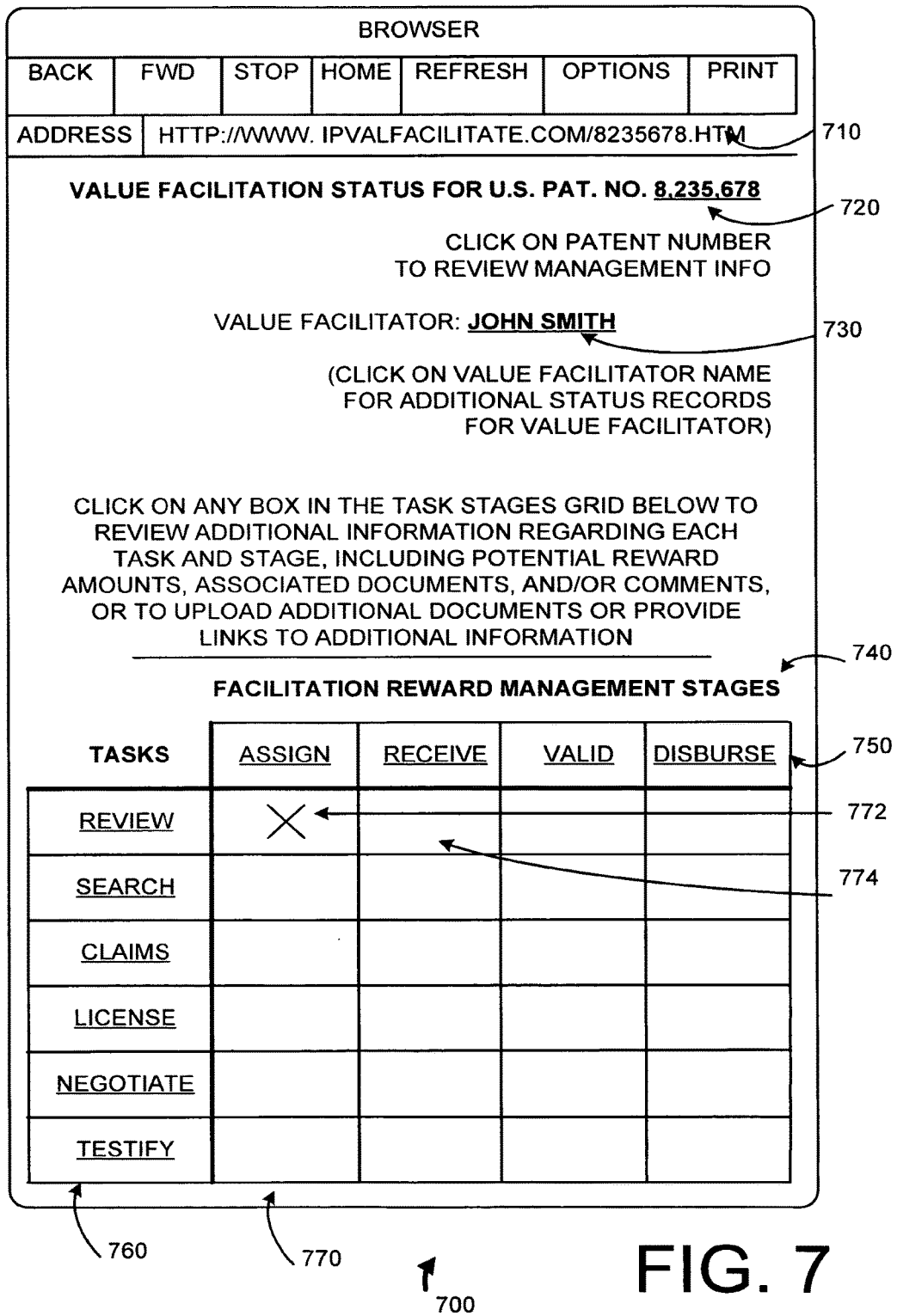
FIG. 7 is a partial screen shot of a web page displaying value facilitation status of an intellectual property asset, in accordance with the embodiment of FIG. 6.

In addition, a website reply invitation 640 is also included in the form of a hyperlink to a website interface provided through the web server 344, in conjunction with the facilitator system 356, an example of which is shown in FIG. 7 and discussed in greater detail below. In other implementations, either the e-mail reply invitation 630 or the website reply invitation 640 is included, but not both. In still other implementations, other types of reply invitations are included in place of, or in addition to, the reply invitations 630 and 640. Work flow systems may also be utilized to communicate and track responses throughout value facilitation process 500, and automated, "clickable" buttons may be included in communications for further facilitating communication and the tracking of it. In yet other implementations, no reply invitations are provided. Finally, example reward information 650 is provided in the request 600. Other implementations include no reward information, and yet other implementations include additional reward information, such as promised dollar amounts, among others. Additional information may also be provided in the request 600, including deadline information for completion of the value facilitation task, among other types of information. Other implementations of the request 600 may include, instead of, or in addition to, the reply invitations 630 and 640, an acceptance invitation whereby the value facilitator is requested to first simply reply with an acceptance of the task, i.e., an indication that the value facilitator 330 will indeed perform the task. Such information could also be tracked and provided as part of the task stages shown in FIG. 7, which is discussed in greater detail below.

After the value facilitation task is assigned and communicated to an assigned value facilitator 330, the value facilitation management system 350, in one embodiment, waits until an indication is received that the task has been completed, as indicated in step 516. While the wait time is not explicitly indicated in FIG. 5, it should be understood that the value facilitation process 500 includes wait times at various places when a user or other process is performing steps described herein. Some implementations also include time-out routines at each wait stage that flag an administrator 336 or takes other actions in order to keep the value facilitation process 500 moving along. In one embodiment, the value facilitator 330 may utilize more automated systems for performing assigned value facilitation tasks. One example of such as system is disclosed in U.S. patent application Ser. No. 11/026,737, filed Dec. 30, 2004, entitled "Infringer Finder," which is incorporated herein by reference in its entirety. In other embodiments, one or more of the automated processes disclosed in that example system are incorporated into the facilitator system 356 so that an external value facilitator 330 is not utilized for some or all value facilitation tasks in those embodiments.

As discussed above, a task completion indication can be received in a variety of different formats, in accordance with different embodiments. For example, an e-mail or instant messaging reply message may constitute the task completion indication in some implementations. In various other implementations, information may be received (and stored) in accordance with a script or other logic at the web server 344 that is processing information received in response to a user interacting with a web page. For example, a user may check a task completion checkbox when the value facilitation task is complete, as well as check other boxes representative of defined responses or results of tasks. A text entry box may also be included for comments and/or Internet addresses of additional information that the value facilitator 330 wishes to reference and be included in the task completion information. A file uploading mechanism may also be included to upload more extensive information, such as lengthy textual and graphics information, among others. The particular visual formats in which such entry devices are provided, as well as the visual formats of other functions discussed herein, are not as important as the fact that the functions themselves are provided, as discussed in accordance with a subset of the embodiments of the present disclosure. Finally, some tasks do not include receiving information from a value facilitator 330. Instead, an administrator 336 provides such indication through an administrative interface, as with other functions performed by an administrator 336. In yet other embodiments, the value facilitation process 500 never waits for a task completion indication to be received, but instead continues to step 518.

In the implementation shown in FIG. 5, with additional continued reference to FIG. 3, step 518 refers to an attempt being made by the validator 334 interacting with the validation system 358 to validate the completion of the value facilitation task (which is one example of determining that a potential realization assistance function has been satisfactorily processed) in order to determine if a reward is authorized in step 520 so that in step 520 an instruction for a reward to be disbursed to the value facilitator 330 can be communicated to the reward disbursement system 342. In one implementation, a particular validator 334 is identified among a plurality of potential validators who are managed by the validation system 358, and then a message or other notification is provided to the identified validator 334 regarding the need for the validator 334 to validate the alleged task completion. In manners similar to the identification of assigners 332 and value facilitators 330 described above, various embodiments include, among others, the validation system 358 managing a list of potential validators 334, as well as embodiments including only one validator 334. Still other embodiments include no validator 334 existing at all, and steps 518 and 520 being omitted for all, system defined, or administrator-selected value facilitation tasks. Yet other embodiments include an automated validation system 358. In some implementations, such an automated validation system 358 would compare task completion information, such as a report from a value facilitator 330, to a set of defined requirements (or criteria) for the task completion information, such as word count, the inclusion of certain words, evaluation of certain concepts, etc., among others. In other implementations, a web page interface may include multiple questions for the value facilitator 330 to answer, after which the validation system 358 and web server 344 perform data integrity checks and other evaluations for the answers to the questions.

As discussed above, in one embodiment, if the validation system 358 determines that the assigned task has been completed successfully, it then determines that a reward is authorized in step 520 and in step 522 instructs the reward disbursement system 342 to disburse a reward to the value facilitator 330. In other embodiments, additional steps may be included after a task completion is validated before the value facilitation management system 350 instructs the reward disbursement system 342 to disburse a reward to the value facilitator 330. For example, additional logic in the value facilitation management system 350 may determine, among other things, whether the value facilitator 330 is still affiliated with the owner of the patent, e.g., still employed by a company who owns the patent, etc. In some embodiments in which unsolicited tasks information is received, an additional valuation analysis may be performed to determine the value of the task before a reward amount is calculated. The administrator 336 and admin system 359 may also be involved in directing the reward disbursement system 342 to disburse the reward to the value facilitator 330. Thus, the validation and authorization determinations are the same determination in some embodiments, but they are separate determinations in other embodiments. If reward authorization does not occur, an explanatory communication is provided back to the value facilitator 330 in some embodiments. As with other communications, such a communication can take several formats, as discussed above. In addition, a validator 334 actually calls the value facilitator 330 on the telephone to verbally communicate this explanatory information in some embodiments in an effort to encourage the value facilitator 330 to continue in the process. Thus, the value facilitator 330 will, in some embodiments, have another opportunity to complete the task to the satisfaction of the validator 334 so that a reward can be authorized.

Subsequently, in step 525 the results of the various steps and methods performed as part of the value facilitation process 500 are stored. As discussed above, the storage is performed in a manner that preserves the relationships between the patent management information in the asset creation and maintenance system 340 and the results of the functions performed by the various users and processes. Thus, reports (e.g., internal and external, online and print, etc.) can be generated that show various stages of tasks for each patent, the tasks and stages for each value facilitator 330, etc. Step 526 indicates that, as discussed above, an escalation of the task levels occurs so that the next pass through the value facilitation process 500 occurs with a next value facilitation task in a series of tasks for the patent.

With continued additional reference to elements of FIGS. 3, 5 and 6, FIG. 7 shows a partial screen shot of a web page 700 displaying value facilitation status of patent, in accordance with the embodiment of FIG. 6. After a value facilitator 330 clicks on the hyperlink in the reply invitation 640 shown in FIG. 6, the web page at an address 710 shown in FIG. 7 appears for the value facilitator 330 in a browser program, as generated by the web server 344. Other embodiments include a requirement that the value facilitator 330 enter authentication information (previously assigned username and password) on an intervening web page before the web page of FIG. 7 is provided to the value facilitator 330. As indicated by a heading on the web page 700, an indication of the patent number 720 and an indication of the name of the value facilitator 730 are provided as hyperlinks in the shown implementation, and the information corresponds to similar information in the message of FIG. 6. As indicated in FIG. 7, the value facilitator 330 is enabled to click on the patent number hyperlink 720 to display additional information from the asset creation and maintenance system 340 regarding the patent, such as maintenance fee information, descriptive information, patentee products protected by the patent, etc. Of course, in various embodiments, the web server 344 would responsively communicate with the asset creation and maintenance system 340, or directly with the storage system 370, to dynamically access and translate such information for display to the value facilitator 330. Likewise, clicking on the value facilitator name hyperlink 730 would provide additional information, similar to that shown on FIG. 7, from the storage system 370 regarding other patents with which the value facilitator 330 is associated.

In addition, a task stage grid 740 is shown including stage headings 750 and task descriptors 760 bordering a grid block portion 770 with a plurality of grid blocks, such as grid block 774, in which X indicators, such as X indicator 772, provide an indication that particular tasks are at particular stages in the value facilitation process 500. As instructions on the web page 700 indicate, clicking on any of the grid boxes, such as grid box 774, will provide additional information regarding the associated task and stage. Such additional information is provided, in some implementations, on separately launched smaller browser pages, and in other implementations, in mouse-over windows, among other acceptable methods. The content of such information can include potential reward information for completion of a particular task, links to additional documents that should be reviewed as part of a task, the actual documents or comments previously provided by the value facilitator 330 for this patent, etc. In one implementation, grid blocks under the "VALID" column may also link to comments from the validator 334 explaining why a reward was or was not authorized for disbursement, in which case an X would not appear in the "DISBURSE" column for such a task. Each of the stage headings 750 and task descriptors 760 are also each shown as hyperlinks, and in some implementations, clicking on such hyperlinks would provide additional descriptive information about such stages and tasks, some of which may be selectively defined for a particular patent, such as by the administrator 336. A user clicking on an empty RECEIVE grid box, after having received an assignment, such grid box 774, will be taken as an indication in some implementations that the value facilitator 330 has completed an assigned task. In addition, in some implementations, activation of a RECEIVE grid box will launch another browser window for the value facilitator 330 to answer additional questions and, depending on the task, upload additional information.

Aspects of embodiments of the present disclosure, such as the asset system 310, among others, can be implemented in hardware, software, firmware, or a combination thereof, among other options. In one embodiment, for example, the asset system 310 is implemented in software or firmware that is stored in one or more memories and that is executed by one or more suitable instruction execution systems, such as a special or general purpose digital computer, such as a personal computer (PC; IBM-compatible, Apple-compatible, or otherwise), workstation, minicomputer, or mainframe computer, among others. When the asset system 310 is implemented in software, as is shown in FIG. 3, it should be noted that the asset system 310 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. Furthermore, any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure. The following U.S. applications are incorporated herein by reference in their entireties: application Ser. No. 10/330,354, Provisional Application No. 60/372,978, application Ser. No. 09/750,001, Provisional Application No. 60/173,919, Provisional Application No. 60/192,862, application Ser. No. 11/026,737, application Ser. No. 10/188,209, application Ser. No. 10/004,497, application Ser. No. 09/750,012, application Ser. No. 09/750,154, application Ser. No. 09/946,457, application Ser. No. 09/750,000, application Ser. No. 09/750,130, application Ser. No. 09/750,001, application Ser. No. 09/946,593, application Ser. No. 09/750,136.

Figure 8:
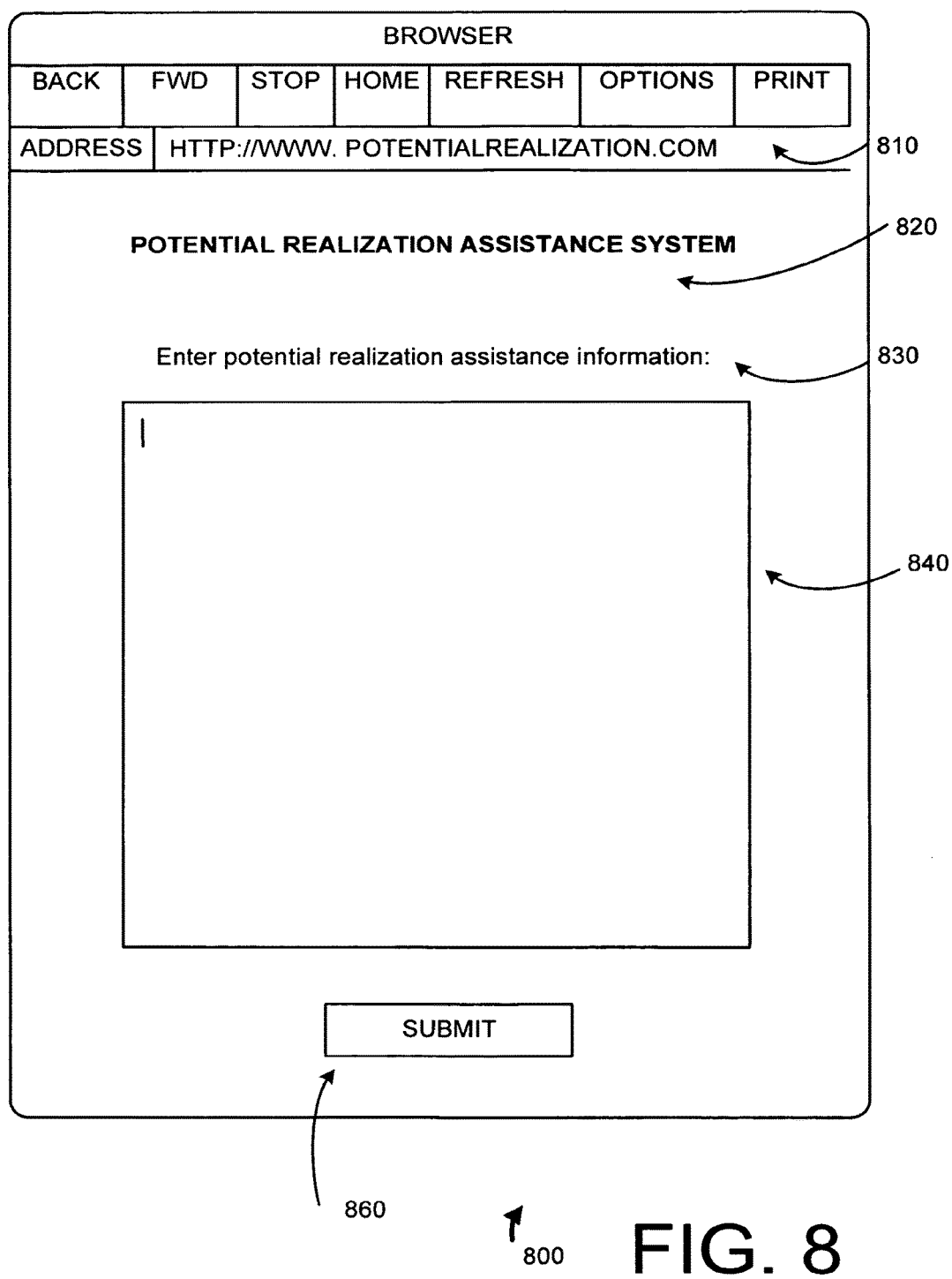
FIG. 8 is a partial screen shot of a web page displaying a potential realization assistance input screen, in accordance with one embodiment of the present disclosure.

Refer now to FIG. 8, which shows a partial screen shot of a web page 800 displaying a more generalized potential realization assistance input screen, in accordance with one embodiment of the present disclosure. Other embodiments are not web based, but instead provide other types of interfaces or accesses in which other types of information can be communicated. After entering a URL 810 or clicking on a hyperlink, a user receives a web page 800 that is served by a web server (not shown) in accordance with one embodiment. After a title 820 indicating that this web page is part of a potential realization assistance system, instructions 830 indicate that the user is prompted to enter potential realization assistance information in area 840. In some embodiments, area 840 includes a free-form text entry box in which a user may describe one or more potentials and potential realization activities, while other embodiments include selectable options and/or categories of options, such as through drop-down boxes or check-boxes with previously defined options accessed through one or more lists or databases, including those located locally and remotely from the web server and including data sources associated with, and those independent from, the web server or entities having the potentials. Thus, in some embodiments, data regarding potentials is evaluated in a manner that is coordinated with and known by entities having potentials, while in other embodiments, entities with potentials are unaware of any of the past or future potential realization activities until later in a multi-staged process, including before and after activities have been performed, in accordance with various embodiments. In various embodiments, requests are made to known (and assigned, according to a process as discussed above) and/or unknown potential realization assistants regarding potentials of other entities having no prior association with the requestor or potential realization assistants, and after one or more potential realization activities are performed, notification is provided to the entities having the potentials that the results or other elements of the previous potential realization activities and/or future potential realization activities are available in exchange for resource incrementation, such as compensation, including as a share of any compensation eventually resulting from such activities. In other embodiments, requests are not made for such potential realization assistance. More generally, the web page 800 can be used in embodiments where there have not been solicitations or requests made of any particular potential realization assistants, as well as those embodiments in which requests have been made through other communications.

A submit button 860 is also shown for a user to submit the entered information and/or selections, at which point the entered information is formed into a communication that is transmitted to the web server to be processed as part of the potential realization assistance system, as discussed above with regard to FIGS. 1 and 2. Thus, in accordance with various embodiments, solicited and unsolicited offers for potential assistance, including past and future activities, may be received through web page 800. Furthermore, the potentials may be those of an entity owning the web server, or logic generating the web page 800, as well as potentials that are not associated in any way with such entities, in accordance with various embodiments. In one example, the web page 800 is part of a site where users are able to describe examples of potential infringements of any patents, for example, in exchange, in one implementation, for compensation as a share of future revenue that changes hands as a result of the description. In such an example, additional processes, including people in some embodiments, as discussed above, would evaluate the description and continue a process for attempting to obtain compensation from the alleged infringer. Other processing may also filter or limit the information being entered through area 840 so that clearly illegitimate entries are excluded or so that only the requested types of information are processed.

It should be emphasized that the above-described embodiments and examples are merely possible examples of implementations, among others, merely set forth for a clear understanding of the principles of the disclosure. Many variations and modifications may be made to the above-described embodiments without departing substantially from the spirit and principles of the disclosure. All such modifications and variations are intended to be included herein within the scope of this disclosure.

What is claimed is:

1. A system comprising:
   a processor; and
   a memory storing executable instructions that, when executed by the processor, cause the processor to perform operations comprising
   identifying an intellectual property asset from a plurality of intellectual property assets as ready for initiation of a process for managing assets without considering, on an asset-by-asset basis, whether each of the plurality of intellectual property assets is ready for initiation of the process for managing assets, wherein identifying the intellectual property asset from the plurality of intellectual property assets is based, at least in part, on the intellectual property asset being associated with a trigger that prompts initiation of the process for managing assets,
   selecting a user associated with the intellectual property asset for performing a task of a plurality of tasks associated with the process for managing assets,
   providing, to the user, a request for performing the task,
   in response to receiving an acceptance to the request from the user, displaying, to the user via an interface, first representations of the plurality of tasks, wherein the plurality of tasks comprise at least one of identifying any known potential infringers of the intellectual property asset, researching sources of information identifying potential infringers of the intellectual property asset, comparing the intellectual property asset with the known potential infringers and the potential infringers identified, or assisting in providing an offer for licensing the intellectual property asset, and
   displaying, to the user via the interface, second representations of a plurality of stages, wherein each of the plurality of tasks is associated with at least one of the plurality of stages.

2. The system of claim 1, wherein the operations further comprise receiving, at the interface from the user, an indication that a stage of the plurality of stages of the task of the plurality of tasks has been completed by the user selected for performing the task.

3. The system of claim 2, wherein the operations further comprise:
   responsive to receiving the indication, determining whether completion of the stage of the task by the user satisfies at least one condition for providing a reward to the user in exchange for completing the stage of the task; and
   providing instructions for disbursement of the reward to the user in response to determining that the user satisfies the at least one condition for providing the reward.

4. The system of claim 3, wherein the task includes analyzing data corresponding to a potential associated with the intellectual property asset to increase a likelihood of realization of the potential, and wherein receiving the indication that the stage has been completed, determining whether completion of the stage satisfies the at least one condition, and providing the instructions for disbursement of the reward are repeated through a multi-staged process for conditional resource incrementation.

5. The system of claim 3, wherein providing the instructions for disbursement of the reward to the user upon determining that the user satisfies the at least one condition for providing the reward comprises effecting a monetary transfer to the user.

6. The system of claim 3, wherein the indication comprises task completion information provided by the user regarding the task, and wherein determining whether completion of the stage of the task by the user satisfies the at least one condition for providing the reward to the user in exchange for completing the stage of the task comprises comparing the task completion information received from the user to a set of defined requirements for the task completion information.

7. The system of claim 3, wherein the operations further comprise determining whether the user is affiliated with an owner of the intellectual property asset before providing the instructions for disbursement of the reward to the user upon determining that the user satisfies the at least one condition for providing the reward.

8. The system of claim 3, wherein the operations further comprise providing a communication to the user regarding non-disbursement of the reward upon determining that the user does not satisfy the at least one condition for providing the reward.

9. The system of claim 1, wherein selecting the user associated with the intellectual property asset for performing the task of the plurality of tasks associated with the process for managing assets comprises:
  analyzing information regarding a plurality of users and information regarding the task; and
  selecting the user from the plurality of users based at least in part upon the task and upon current workloads of the plurality of users.

10. The system of claim 1, wherein the intellectual property asset is a patent, and wherein the user includes an inventor on the patent.

11. The system of claim 1, wherein the trigger comprises at least one of payment of an issue fee associated with the intellectual property asset or payment of a maintenance fee associated with the intellectual property asset.

12. The system of claim 1, wherein selecting the user associated with the intellectual property asset for performing the task of the plurality of tasks associated with the process for managing assets comprises:
  accessing first information regarding a plurality of users that includes subject matter area information for each user of the plurality of users and accessing second information regarding the intellectual property asset;
  performing a comparison of the second information regarding the intellectual property asset to the subject matter area information for the plurality of users;
  performing a load balancing analysis that facilitates balancing of workloads for the plurality of users; and
  identifying the user from the plurality of users for performing the task of the plurality of tasks based on results of the comparison and the load balancing analysis.

13. A method comprising:
  identifying, by a system comprising a processor, an intellectual property asset from a plurality of intellectual property assets as ready for initiation of a process for managing assets without considering, on an asset-by-asset basis, whether each of the plurality of intellectual property assets is ready for initiation of the process for managing assets, wherein identifying the intellectual property asset from the plurality of intellectual property assets is based, at least in part, on the intellectual property asset being associated with a trigger that prompts initiation of the process for managing assets;
  selecting, by the processor, a user associated with the intellectual property asset for performing a task of a plurality of tasks associated with the process for managing assets;
  providing, by the processor, a request to the user for performing the task;
  in response to receiving an acceptance to the request from the user, displaying, by the processor to the user via an interface, first representations of the plurality of tasks, wherein the plurality of tasks comprise at least one of identifying any known potential infringers of the intellectual property asset, researching sources of information identifying potential infringers of the intellectual property asset, comparing the intellectual property asset with the known potential infringers and the potential infringers identified, or assisting in providing an offer for licensing the intellectual property asset; and
  displaying, by the processor to the user via the interface, second representations of a plurality of stages, wherein each of the plurality of tasks is associated with at least one of the plurality of stages.

14. The method of claim 13, further comprising:
  receiving, by the processor from the user via the interface, an indication that a stage of the plurality of stages of the task of the plurality of tasks has been completed by the user selected for performing the task;
  responsive to receiving the indication, determining, by the processor, whether completion of the stage of the task by the user satisfies at least one condition for providing a reward to the user in exchange for completing the stage of the task; and
  providing, by the processor, instructions for disbursement of the reward to the user upon determining that the user satisfies the at least one condition for providing the reward.

15. The method of claim 14, further comprising determining whether the user is affiliated with an owner of the intellectual property asset before providing the instructions for disbursement of the reward to the user upon determining that the user satisfies the at least one condition for providing the reward.

16. The method of claim 13, wherein the intellectual property asset is a patent and the user is an inventor on the patent.

17. The method of claim 13, wherein selecting the user associated with the intellectual property asset for performing the task of the plurality of tasks associated with the process for managing assets comprises:
  accessing first information regarding a plurality of users that includes subject matter area information for each user of the plurality of users and accessing second information regarding the intellectual property asset;
  performing a comparison of the second information regarding the intellectual property asset to the subject matter area information for the plurality of users;
  performing a load balancing analysis that facilitates balancing of workloads for the plurality of users; and
  identifying the user from the plurality of users for performing the task of the plurality of tasks based on results of the comparison and the load balancing analysis.

18. The method of claim 13, wherein the trigger comprises at least one of payment of an issue fee associated with the intellectual property asset or payment of a maintenance fee associated with the intellectual property asset.

19. A computer readable storage device storing computer-executable instructions that, when executed by a system comprising a processor, causes the processor to perform operations comprising:
  identifying an intellectual property asset from a plurality of intellectual property assets as ready for initiation of a process for managing assets without considering, on an asset-by-asset basis, whether each of the plurality of intellectual property assets is ready for initiation of the process for managing assets, wherein identifying the intellectual property asset from the plurality of intellectual property assets is based, at least in part, on the intellectual property asset being associated with a trigger that prompts initiation of the process for managing assets;

selecting a user associated with the intellectual property asset for performing a task of a plurality of tasks associated with the process for managing assets;

providing a request to the user for performing the task;

in response to receiving an acceptance to the request from the user, displaying, by the processor to the user via an interface, first representations of the plurality of tasks, wherein the plurality of tasks comprise at least one of identifying any known potential infringers of the intellectual property asset, researching sources of information identifying potential infringers of the intellectual property asset, comparing the intellectual property asset with the known potential infringers and the potential infringers identified, or assisting in providing an offer for licensing the intellectual property asset; and displaying, to the user via the interface, second representations of a plurality of stages, wherein each of the plurality of tasks is associated with at least one of the plurality of stages.

20. The computer readable storage device of claim 19, wherein the operations further comprise:

receiving, from the user via the interface, an indication that a stage of the plurality of stages of the task of the plurality of tasks has been completed by the user selected for performing the task;

responsive to receiving the indication, determining whether completion of the stage of the task by the user satisfies at least one condition for providing a reward to the user in exchange for completing the stage of the task; and providing instructions for disbursement of the reward to the user upon determining that the user satisfies the at least one condition for providing the reward.

* * * * *